May 24, 1966  L. D. GREENWOOD  3,252,656
SPRAY DISCHARGE HEAD
Filed Nov. 20, 1963  3 Sheets-Sheet 1
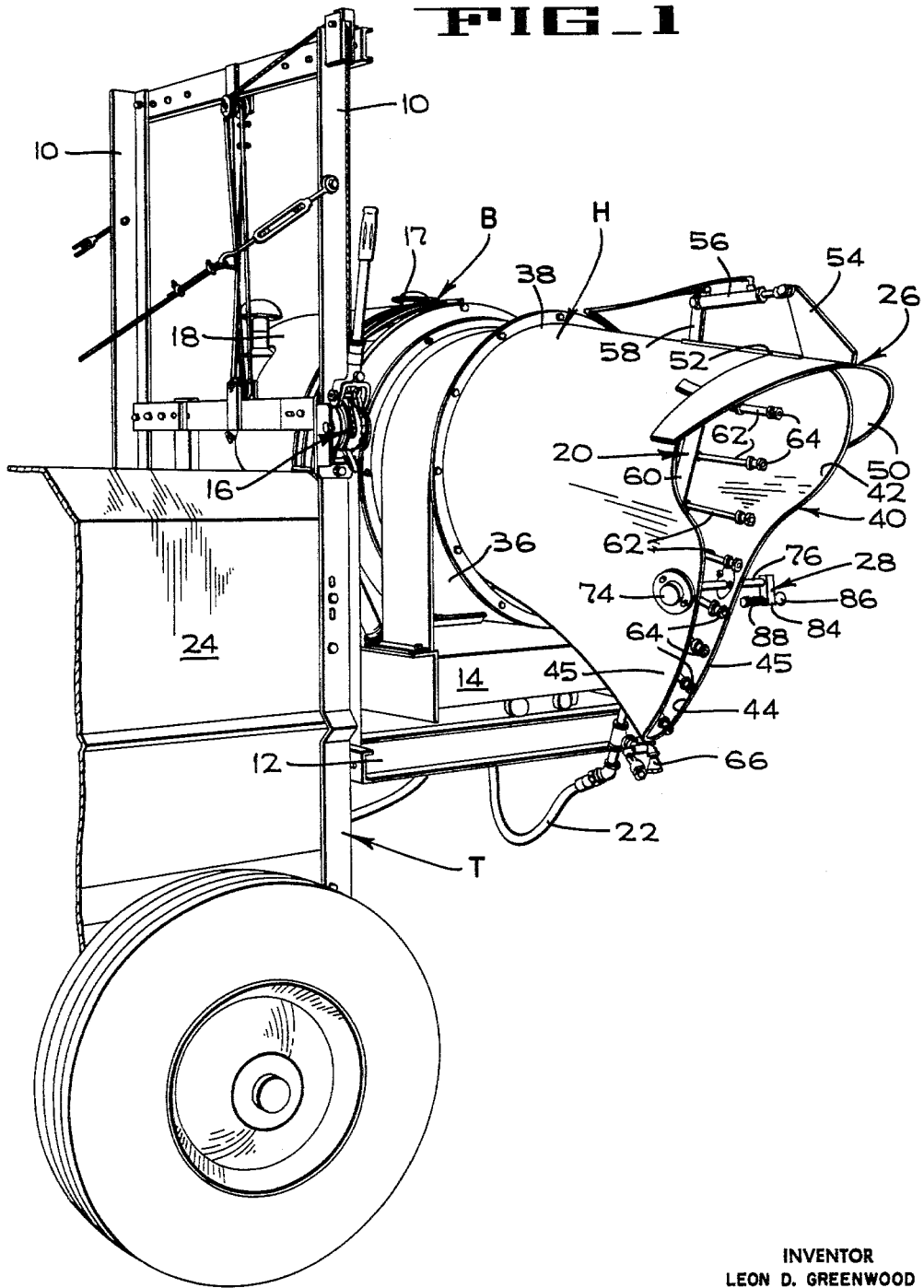
FIG_1
INVENTOR
LEON D. GREENWOOD
BY *Hans G. Hoffmeister*
ATTORNEY

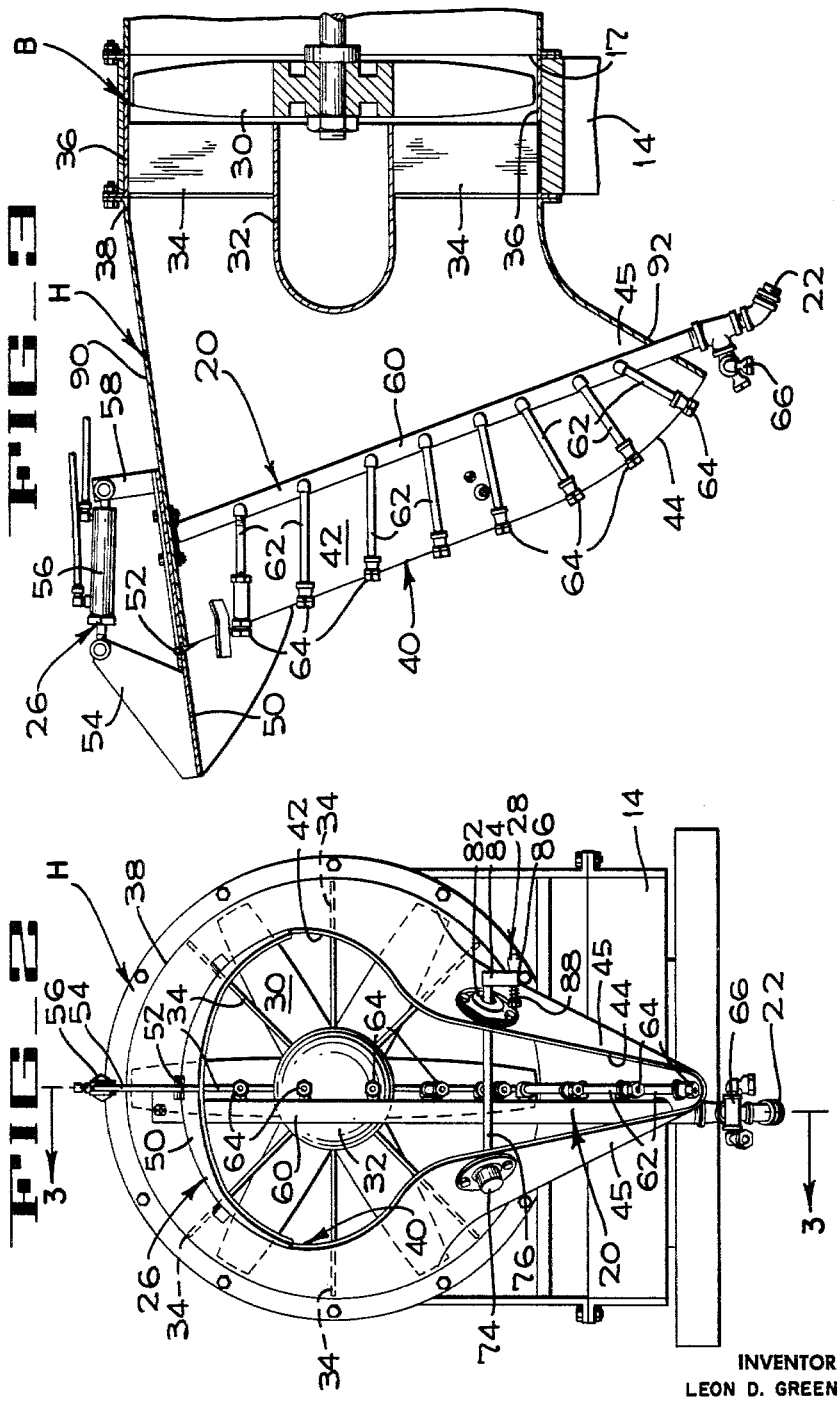

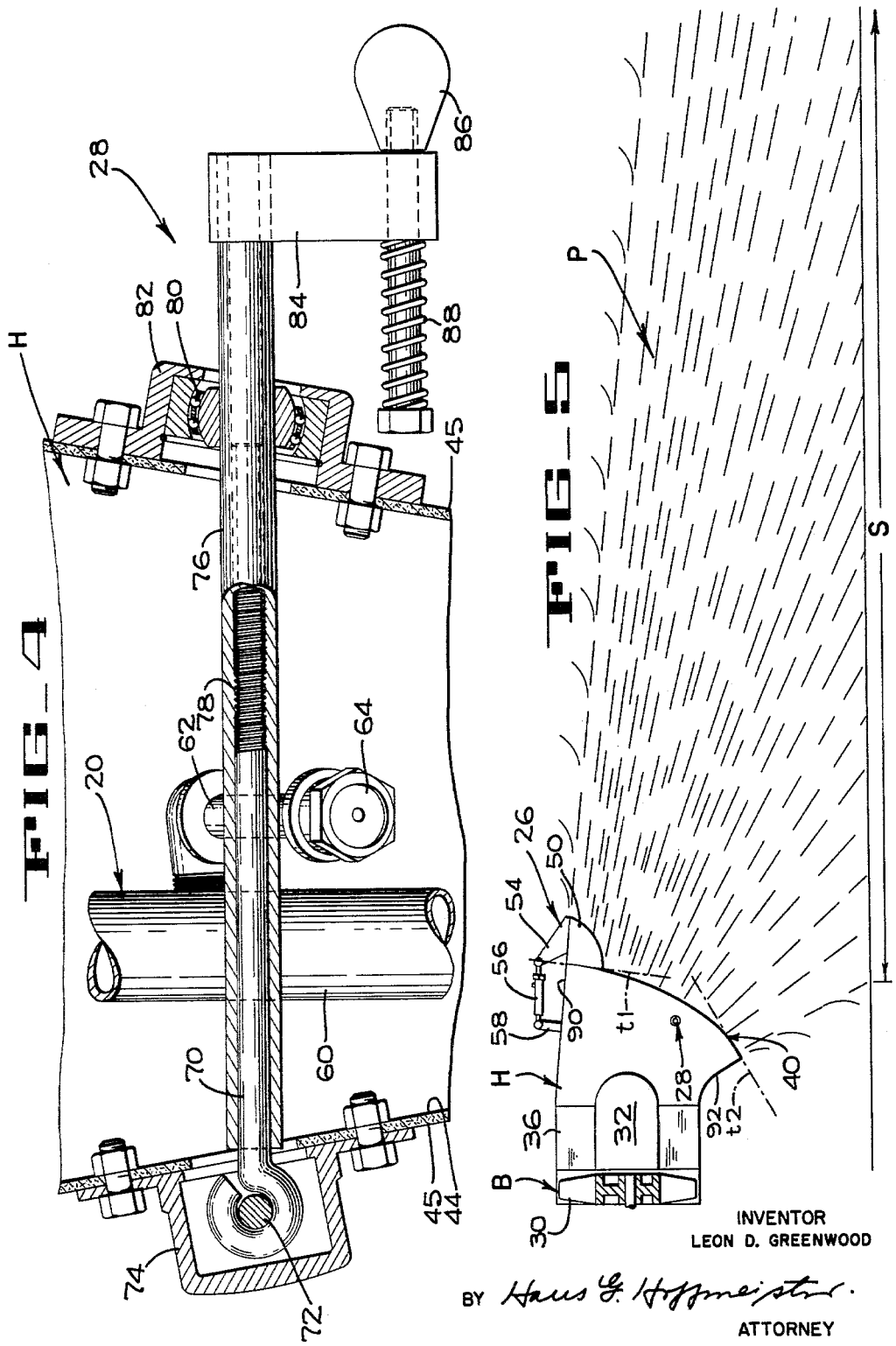

United States Patent Office 3,252,656
Patented May 24, 1966

3,252,656
SPRAY DISCHARGE HEAD
Leon D. Greenwood, Lansing, Mich., assignor to FMC Corporation, San Jose, Calif., a corporation of Delaware
Filed Nov. 20, 1963, Ser. No. 324,982
3 Claims. (Cl. 239—77)

This invention relates to agricultural sprayers for spraying and dusting plants, such as row crops. In the present invention, an axial fan or blower is mounted in the rear of a discharge head, and at the mouth of the discharge head is mounted a spray nozzle manifold. To this extent, the sprayer of the present invention is like that of the Patterson Patent 2,828,158, March 25, 1958, assigned to the assignee of the present invention. In fact, the present invention can be considered to be an improvement over the sprayer of the aforesaid patent. As will be seen, in accordance with the present invention, the contour of the outlet mouth of the sprayer discharge head is adjustable for providing precise control of the spray pattern.

An object of the present invention is to provide a uniform discharge pattern of the spray material across the swath of the spray.

Another object is to reduce the velocity and energy losses of the air blast, as it passes through the sprayer discharge head.

A further object is to provide a sprayer discharge head which minimizes and simplifies the adjustment requirements for various patterns and wind conditions.

A further object of the invention is to eliminate the need for horizontal deflectors in the discharge head.

Another object of the invention is to eliminate turbulence in the air stream or blast through the discharge head, caused by the horizontal deflectors previously required therein.

A further object is to reduce the turbulence in the airstream or blast through the discharge head caused by the spray manifold.

Another object of the present invention is to provide a discharge head that permits adjustment of the flow gradient across the head, taken in a vertical direction. This makes possible directing a relatively light blast of air from the lower portion of the head to avoid injuring delicate plants such as tomatoes; or directing a relatively higher volume of air from the lower portion of the head to drive the spray material into hardier plants, such as mature potatoes, or the like.

Another object of the present invention is to provide an adjustable deflector at the top of the discharge head for assisting in controlling the spray pattern, as well as for controlling the discharge of spray from the upper portion of the discharge head under certain wind conditions.

Another object is to shape the face of the outlet mouth of the discharge head to facilitate producing the desired spray pattern.

The manner in which these and other objects and advantages of the present invention may be obtained will be apparent from the following detailed description thereof.

In the drawings:

FIG. 1 is a perspective of a sprayer trailer mounting the discharge head of the present invention. Only the rear portion of the trailer and its spray tank are shown in this figure.

FIGURE 2 is a front elevation of the discharge head of the present invention.

FIGURE 3 is a section taken on lines 3—3 of FIGURE 2.

FIGURE 4 is a fragmentary enlarged vertical section taken through the discharge head adjusting mechanism.

FIGURE 5 is a sketch showing the uniform distribution pattern of the discharge head of the present invention.

The general arrangement of a spray rig embodying the present invention appears in the perspective of FIGURE 1. The rig is mounted on a trailer T having vertical rear side rails 10. A platform 12 is vertically adjustable along the side rails 10, and the platform mounts a turntable 14. Turntable 14 can be rotated on the platform 12 about a vertical axis, by means not shown and not critical to the present invention.

Supported on the turntable 14 is a blower assembly B, from which projections a discharge head H, forming part of the present invention. The platform 12 carrying the blower assembly B, is vertically adjustable on the side rails 10, by a winch indicated generally at 16, the details of which are not important to the invention.

The blower assembly B is formed with an air inlet 17, and an axial flow fan is mounted in the blower assembly B, behind the discharge head H, the fan not appearing in FIGURE 1. The fan is driven by an internal combustion engine 18 in the usual manner.

Mounted adjacent the outlet mouth of the discharge head H, is a manifold and nozzle assembly indicated generally at 20. This assembly is supplied with spray material, such as spray liquid or a dusting powder. In the arrangement shown in the drawings, the spray material is conveyed by means of a supply line 22 into which material is pumped by a pump (not shown) from the tank 24 on the trailer T. Mounted across the upper portion of the outlet mouth on the discharge head H is a deflector assembly indicated generally at 26, the purpose of which will be explained in detail presently. A feature of the invention resides in an assembly 28, for adjusting the lower discharge throat foamed at the outlet mouth of the discharge head H.

Additional details of the discharge head H appear in FIGURES 2 and 3. As seen in FIGURE 3, an axial flow fan 30 of conventional design forms part of the blower assembly B. Just downstream of the fan is a fixed nose 32, from which extends a plurality of radial air stream straightening blades 34. The outer end of the blades 34 are welded to the inner periphery of a generally cylindrical air duct 36, the axis of which is substantially horizontal.

The discharge head H has a rearward circular portion 38 that is mounted to, and projects forward from the fan duct 36. As seen in FIGURE 2, the outlet mouth of the discharge head H, indicated generally at 40, has a contour which will be described as resembling that of an inverted pear. Thus the outlet mouth 40 presents to the blast of air generated by the fan 30, an upper arcuate portion 42, which is generally circular in contour, and a lower reduced area portion 44, having opposed slightly divergent walls 45. The spacing of the opposed walls 45, one from the other, is regulated by the discharge throat adjustment assembly 28, previously referred to.

The deflector assembly 26 includes an arcuate deflector plate 50, which is contoured to generally match the contour of the upper portion 42 of the outlet mouth 40, of the discharge head H. The deflector plate 50 is hinged to the discharge head body by means of a hinge 52, and the deflector plate is operated by a vertically extending operating plate 54, to which is connected hydraulic cylinder assembly 56. The other end of the hydraulic cylinder assembly 56 is connected to the body portion of the discharge head by a post 58. In accordance with conventional design, the spray rig includes a hydraulic pump and pressure system so that the hydraulic cylinder 56 for the deflector plate 50 can be remotely controlled by valve means, not shown and not critical to the present invention. Similarly, the turntable 14 (FIGURE 1) can be rerotated by hydraulic power under remote control, the details of this system likewise forming no part of the present invention.

The manifold and nozzle assembly, indicated generally at 20, include a generally vertically extending manifold pipe 60, as best seen in FIGURE 3. The manifold pipe 60 is mounted axially inwardly of the outlet mouth 40 of the discharge head. A plurality of elbowed nozzle pipes 62 project forwardly from the manifold pipe 60, and conventional spray nozzles 64 are mounted at the ends of the pipes 62. As seen in FIGURE 2, the nozzles 64 lie in the mid plane of the discharge head H.

The mounting of the manifold pipe 60 just described forms a feature of the present invention. Prior sprayers of the type to which this invention relates have a manifold pipe corresponding to manifold pipe 60 mounted substantially in the plane of the outlet mouth of the discharge head. This creates turbulence of the air blast just as it leaves the outlet mouth of the discharge head, and interferes with the spray pattern. By mounting the manifold pipe 60 as shown in FIGURE 3, after the air blast passes the manifold pipe, it has an opportunity to reform, and present a smooth stream of rapidly moving air to the nozzles 64 at the outlet mouth 40.

As is seen in FIGURES 1–3, if desired an auxiliary boom 66 may be provided for conducting spray materials directly to the ground, without interference therewith from the air blast. This boom and the associated nozzles are not part of the present invention.

The throat adjustment mechanism 28, for the lower portion 44 of the outlet mouth 40 of the discharge head H, is seen in the enlarged view of FIGURE 4. This mechanism includes a threaded eye bolt 70, the head of which loosely fits over a pin 72 that is fixed in a cap 74, mounted on one of the opposed walls 45 of the discharge head. An operating sleeve 76, having a short internally threaded portion 78, is threaded to the threaded end of the eye bolt 70. The sleeve 76 is press fitted into the inner race of a self aligning bearing 80, which is retained in a bearing cup 82 secured to the opposite wall 45 of the discharge throat. A crank 84 is secured to the opposite end of the threaded sleeve 76, and carries a slideable handle 86, which is spring urged to the left, as viewed in FIGURE 4, by means of a spring 88. This action provides an automatic latching feature for the throat adjustment.

The discharge head H is formed of a tough corrosion resistant flexible material, such as a fiberglass reinforced sheet material havign a resin matrix. These materials are well known in industry, and the details thereof need not be described. The material accommodates relative inward and outward motion of the opposed walls 45 of the discharge head H, in response to operation of the crank 86 and the threaded sleeve 76.

The area of the outlet mouth 40 of the discharge head H is less than the area of the duct 36. For example in a typical discharge head, the effective area of the duct 36 (the area of the duct less the area of nose 32) may be in the order of 600 square inches. With the adjustment illustrated in FIGURE 2, the effective area of the outlet mouth 40 of the discharge head H (neglecting the effect of the deflector plate 50) will be in the order of 410 square inches. Stated differently, the area of the outlet mouth 40 of the discharge head H is in the order of 68% of the effective area of the fan duct 36. However, this percentage will vary in accordance with the adjustment of the throat adjusting mechanism 28, but the area of the outlet mouth 40 is always less than that of the duct 36.

As illustrated in the sketch of FIGURE 5, it has been found that with the discharge head H of the present invention, a uniform spray pattern P will be obtained across the entire width of the swath S. It has been found that the use of horizontal deflectors at the outlet mouth, as proposed in the aforesaid Patterson patent, are not required. Elimination of these deflectors, coupled with the improved mounting of the manifold 60 axially inwardly of the outlet mouth 40, provides a uniform spray pattern, as described. Prior devices incorporating a set of vertically spaced, horizontal deflectors, introduce variations of the density of the spray material delivered across the swath. The elimination of the deflectors also eliminates the need for adjustment thereof.

The adjusting mechanism 28 for the outlet flow of the discharge head assists in balancing the nature of the pattern across the swath. For example, if delicate plants such as young tomatoes are being sprayed, those plants that are nearest the discharge head H (those plants that are substantially under the lower portion 44 of the head) might receive too heavy an air blast, and might be damaged. If this appears to be the case, the adjusting mechanism 28 is operated to bring the opposed wall 45 of the discharge head H closer together. This reduces the effective area of the lower portion 44, of the outlet mouth of the discharge head, and hence the volume of air that emits from the lower portion 44 of the outlet mouth, relative to the volume of air that emits from the upper portion 42 thereof.

On the other hand, if it is desired to drive the spray material into relatively hardy plants, such as almost ripe potato plants or the like, the adjusting mechanism 28 can be manipulated to cause the walls 45 of the outlet mouth to be spread further apart. This causes an additional volume of air to emit from the lower portion 44 of the outlet mouth 40.

The deflector plate 50 also can be utilized to adjust the spray pattern. The principal function of the deflector plate 50 is to deflect the upper portion of the air pattern as it leaves the spray head. Also, when the deflector plate is lowered, it pressurizes the air within the upper portion 42 of the discharge head to a greater degree than before, relative to the pressure within the lower portion 44 thereof. Thus when the deflector plate is lowered, relatively more air will emit from the lower portion 44 of the discharge head than from the upper portion 44. Of course, the reverse action can also be caused to take place. However, and as mentioned, the deflector plate 50 is primarily used to control the amount of air admitted from the upper portion of the discharge head to control the effects of certain wind conditions. On windy days, and with the wind blowing in certain directions, it may be desired to restrict somewhat the area of the envelope of the air blast emitted from the upper portion 42 of the discharge head. This envelope can in effect be lowered and limited by lowering the deflector plate 50.

Another feature of the invention resides in the configuration of the curved transverse plane in which the discharge or outlet edge of the discharge head H lies. The curvature of this plane, which will be referred to as the "face of the outlet mouth," is shown in FIGURES 3 and 5. This curvature is selected to take advantage of the fact that the discharge head H acts as a nozzle, as previously described. By selecting a configuration for the curve wherein the tangent to the curve is substantially normal to the desired direction of air discharge, it has been found that full advantage can be taken of the tendency of a stream emitting from a nozzle to emerge in a direction normal to the face of the outlet mouth.

Thus as indicated in FIG. 5, the upper tangent *t1* to the face of the outlet mouth is substantially normal to the upper wall 90 of the discharge head H, and the lower tangent *t2* is substantially normal to the lower wall 92 of the head. Thus a spray pattern is established which has the desired contour in the vertical plane, as shown in FIG. 5. In spraying the ground, it will be noted that the upper wall 90 of the discharge head H inclines downwardly somewhat from the horizontal, and that the lower wall 92 diverges downwardly from the upper wall, to direct the lower portion of the spray pattern toward the ground.

Thus the deflector mechanism 26 provides a dual type control. This dual control taken in conjunction with the control offered by the throat adjusting mechanism 28, provides a flexible spray discharge head assembly, which can be adjusted to suit both wind and crop conditions. Furthermore, the discharge head H will at all times provide a spray pattern of substantially uniform density across the swath. Control of the air blast always remains in the hands of the operator, because the area of the outlet mouth 40 of the discharge head H is less than the effective area of the fan duct 36, as previously described, with additional control being provided by the deflector plate 50, as described. The discharge head always acts somewhat as an air blast nozzle, and at all times giving relatively precise control of the spray pattern.

Having described the preferred embodiment of the invention so those skilled may practice the same, I claim:

1. Spraying apparatus comprising a substantially cylindrical air duct having a generally horizontal axis, fan means for forcing a blast of air through said duct, a discharge head projecting forwardly from said duct, the outlet mouth of said discharge head having the general contour of an inverted pear, the area of the outlet mouth being less than the effective cross-sectional area of said duct, means for adjusting the spacing of the opposed walls of said discharge head at the narrower, generallly lower portion of the outlet mouth, generally vertical manifold means mounting a row of spray nozzles disposed at the outlet mouth of said discharge head, said vertical manifold means including a vertically extending portion disposed a substantial distance axially inward of the outlet mouth of said discharge head, and said nozzles being in substantially axial alignment with the outlet mouth so that the air blast is reformed downstream of the turbulence caused by said vertically extending manifold to assist in forming a smooth spray pattern.

2. The spraying apparatus of claim 1, wherein a deflector is pivotally mounted at the upper, wider portion of the outlet mouth of said discharge head, and wherein means are provided for raising and lowering said deflector to vary the effective area of said upper portion of the outlet mouth.

3. The spraying apparatus of claim 1, wherein said discharge head is formed of a flexible, fiber glass reinforced sheet material.

References Cited by the Examiner

UNITED STATES PATENTS

| | | | |
|---|---|---|---|
| 1,036,765 | 8/1912 | Wismar | 239—601 |
| 2,029,337 | 2/1936 | Parker | 239—455 |
| 2,429,374 | 10/1947 | Shade | 239—77 |
| 2,736,605 | 2/1956 | Spreng | 239—78 |
| 2,828,158 | 3/1958 | Patterson | 239—78 |
| 3,069,091 | 12/1962 | Giesse et al. | 239—77 |

FOREIGN PATENTS

| | | |
|---|---|---|
| 538,750 | 1/1956 | Italy. |

M. HENSON WOOD, Jr., *Primary Examiner.*

EVERETT W. KIRBY, *Examiner.*

D. L. MOSELEY, VAN C. WILKS, *Assistant Examiners.*